United States Patent
Boyer et al.

[11] Patent Number: 5,600,645
[45] Date of Patent: Feb. 4, 1997

[54] BIT RATE RESERVATION AT SWITCHING NODES OF AN ASYNCHRONOUS NETWORK

[75] Inventors: Pierre Boyer, Lannion; Christophe Mangin, Louannec; Michel Servel, Lannion, all of France

[73] Assignee: France Telecom, Paris, France

[21] Appl. No.: 505,593

[22] Filed: Jul. 21, 1995

[30] Foreign Application Priority Data

Jul. 21, 1994 [FR] France .................................. 94 09146

[51] Int. Cl.⁶ .................................................. H04L 12/56
[52] U.S. Cl. ........................ 370/395; 370/468; 370/391
[58] Field of Search ........................ 370/60, 60.1, 94.1, 370/94.2, 84, 112, 79, 110.1, 80, 95.1, 118, 95.2, 95.3, 29, 77, 68, 94.3, 108; 375/224, 225, 220; 340/825.02; 348/419, 409

[56] References Cited

U.S. PATENT DOCUMENTS

| | | | |
|---|---|---|---|
| 5,081,620 | 1/1992 | Girard et al. .............................. | 370/60 |
| 5,200,952 | 4/1993 | Bernstein et al. ........................ | 370/79 |
| 5,390,184 | 2/1995 | Morris .................................... | 370/94.2 |

OTHER PUBLICATIONS

"A Reservation Principle with Applications to the ATM Traffic Control", Pierre Boyer et al., Computer Networks and ISDN Systems, vol. 24, No. 4, May 1992, pp. 321–334.

Primary Examiner—Douglas W. Olms
Assistant Examiner—Dang Ton
Attorney, Agent, or Firm—Lowe, Price, LeBlanc & Becker

[57] ABSTRACT

Bit rate reservation is effected with the aid of a reservation cell containing a requested bit rate transmitted from a calling terminal to a called terminal via switching nodes of an asynchronous network. At each node, a bit rate increase request is at least partially satisfied even if the difference between the requested bit rate and the current bit rate is greater than the bit rate available at the node. The node replaces the requested bit rate in the reservation cell by a new bit rate lower than the latter so that the called terminal receives the lower new adopted bit rate by the nodes. An acknowledgement cell retransmitted with this lower new bit rate by the called terminal renders uniform the adopted bit rate at all the nodes. If no acknowledgement cell has been received after a predetermined time-delay the nodes revert to their initial state, with the current bit rate preceding the bit rate reservation.

19 Claims, 3 Drawing Sheets

BIT RATE RESERVATION AT SWITCHING NODES OF AN ASYNCHRONOUS NETWORK

BACKGROUND OF THE INVENTION

1. Field of the Invention

The present invention is generally concerned with a resource reservation protocol in an asynchronous transfer mode (ATM) network.

2. Description of the Prior Art

In an asynchronous network resources are time-shared between a plurality of user terminals. Data units called cells form a stream with no time reference in respect of their relative positions. The cells carry identifiers of routing channels connecting user terminals respectively. Unlike the synchronous time-division technique, no predetermined time slot is assigned to the cells of a routing channel. A user terminal chooses a bit rate for the cells to be transmitted without direct reference to the network, the instantaneous bit rate between the terminal and the network being always the same.

According to the telecommunication network operators, ATM networks will grow in two stages. These two stages are shown diagrammatically in FIG. 1. During a first stage, a network operator will provide a "meshed" network offering a leased line service to each user terminal. The final "switched" network that will interconnect all user terminals will come about in a second stage.

Figure 1:
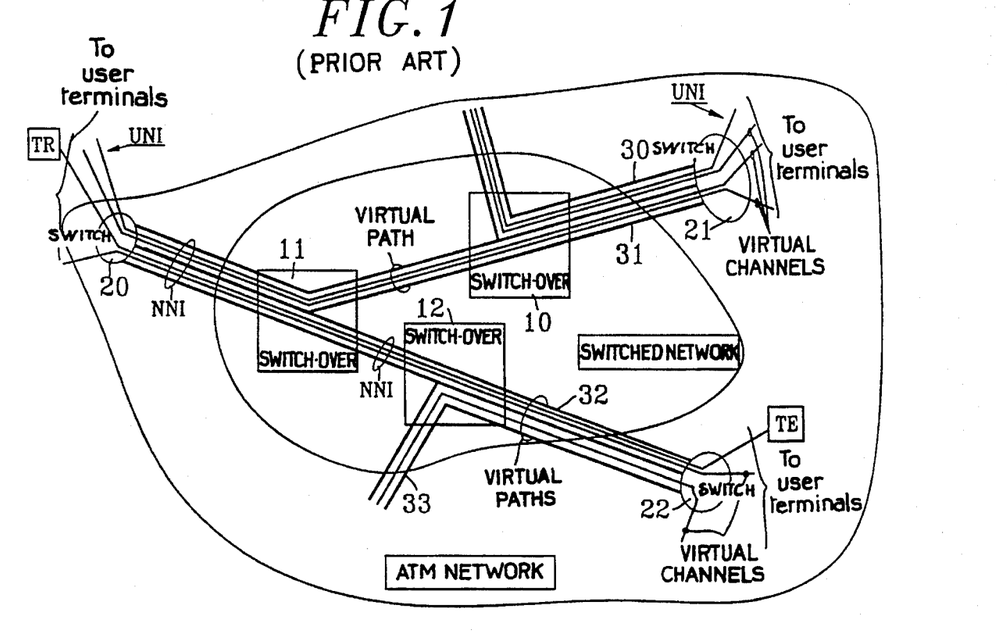
FIG. 1, already commented on, is a drawing of the architecture of a finalized ATM network to explain the two stages in the growth of such networks.

The meshed network will provide a fast response to business users who represent a high demand for high bit rate communications. The meshed network is made up of switch-over units 10, 11 and 12 which switch-over virtual routing channels in a virtual path 30, 31, 32, 33 to another virtual path according to the leased line in question. A plurality of user terminals share the same virtual path which connects a particular two switch-over units.

The second stage will result from the addition to this meshed network infrastructure of ATM switches 20, 21 and 22 that will switch virtual channels between incoming and outgoing virtual paths of the switches. In this second stage, the offer will no longer be limited to a leased line service offering the user only a high bit rate link between two predetermined terminals. Each user terminal will have the benefit of a fully switched service that can connect it to any other user terminal.

In the meshed network a plurality of user terminals share the same virtual path. The main advantage of the asynchronous transfer mode is that each user terminal transmits data cells at its own bit rate. To optimize the bandwidth of the virtual path, a respective cell transmission bit rate is reserved by each user terminal before it transmits data cells. A bit rate fast reservation protocol has been defined whereby the bit rate in a virtual path requested by a given user terminal is constant or variable, and a bit rate modification can be requested by the user terminal even during a call already set up.

More particularly the invention relates to a method of bit rate reservation at switching nodes of an asynchronous transfer mode (ATM) network through which passes a routing channel having a current bit rate stored at the nodes and situated between first and second terminals. In each of node is received a reservation cell that contains a requested bit rate. The reservation cell transmitted from the first terminal through the network is received by each node, then is transmitted by an outgoing multiplex channel having a maximum bit rate through the network to the second terminal. In each of the nodes along the routing path is received an acknowledgement cell which is transmitted by the second terminal to the first terminal through the network in response to the retransmitted reservation cell.

A bit rate reservation method of this kind is described in U.S. Pat. No. 5,081,620. In this method a reservation cell and an acknowledgement cell constitute first and second call request packets. A resource, i.e. a bit rate, in the outgoing multiplex channel constituting a virtual path at each switching node through which the routing channel passes is allocated to the first terminal in each passed switching node when the requested bit rate is less than an available bit rate equal to the difference between a maximum disposable bit rate and a total of bit rates of other logical routing channels using the outgoing multiplex channel. Thus if the requested bit rate is near but below the available bit rate, there remains in practise no available resource to be allocated to other user terminals, whereas if the requested bit rate is higher than the available bit rate the connection is refused, even though part of the available bit rate might have been temporarily useful to the calling user.

The article "A reservation principle with applications to the ATM traffic control" by Pierre BOYER and Didier TRANCHIER published in "Computer Networks and ISDN Systems", vol. 24, no. 4, May 1992, Amsterdam, pages 321–334, describes a fast reservation protocol with delayed transmission (FRP-DT). A protocol of this kind is also intended for sources with a bit rate that varies in negociated steps.

A first user terminal is initially connected to a second user terminal by transmitting an allocation request in respect of a given bit rate. If the bit rate reserved needs to be increased or decreased during the call between the two terminals, the first terminal transmits a bit rate increase or decrease request cell. This cell is received by a protocol control unit associated with a plurality of terminals and located at the input of the ATM network. In response to a bit rate increase or decrease request cell, the control unit transmits a limited number of successive bit rate increase or decrease requests provided that previous requests have not been satisfied. In the case of a bit rate increase request, if the bit rate increase requested cannot be satisfied entirely within the network, the bit rate increase request is entirely rejected. Otherwise, the first terminal is allocated a greater bandwidth according to the requested bit rate increase. In all cases the current bit rate already allocated to the terminal is not contested and a bit rate decrease request constitutes a purely indicative procedure that is never rejected.

Thus in the aforementioned patent and article, a bit rate increase request, i.e. a request for a bit rate higher than the current bit rate already allocated to a virtual routing channel between two terminals, is not satisfied completely or is satisfied entirely, without consideration as to whether some of the available resource at the switching nodes could have been allocated to the calling terminal whose request has not been met and some other part of the available resource could have been retained for other terminals requesting resource.

Furthermore, the second terminal does not transmit any explicit reserved bit rate acknowledgement, which can lead to errors in the allocation of bit rates to the routing channels.

OBJECTS OF THE INVENTION

The main object of this invention is to provide a bit rate reservation method for an asynchronous network which overcomes the drawbacks of the prior art previously mentioned.

Another object of this invention is in particular to allocate a bit rate to a terminal connected by a routing channel even if at least one of the switching nodes through which the routing channel passes offers an available bit rate lower than the requested bit rate by the terminal.

SUMMARY OF THE INVENTION

According to this invention, there is provided a method of bit rate reservation at switching nodes of an asynchronous transfer mode network through which passes a routing channel having a current bit rate stored at the nodes and extending between first and second terminals, a reservation cell being received in each switching node, the reservation cell containing a requested bit rate, having been transmitted from the first terminal through the network and being retransmitted on an outgoing multiplex channel from each switching node having a maximum bit rate through the network to the second terminal, and an acknowledgement cell being received by each switching node, the acknowledgment cell being transmitted from the second terminal to the first terminal through the network in response to the reservation cell retransmitted on the outgoing multiplex channel.

The method comprises the following steps effected at each switching node if the requested bit rate contained in the reservation cell received by each switching node is greater than the current bit rate:

decreasing the requested bit rate as function of a difference between the requested bit rate and the current bit rate and a stored total of bit rates accepted and in process of acceptance relating to other routing channels using the outgoing multiplex channel to provide a new bit rate lower than the requested bit rate, even when the difference between the requested bit rate and the current bit rate is higher than the difference between the maximum bit rate of the outgoing multiplex channel and the stored total;

subtracting the current bit rate from the stored total to provide a first temporary total;

replacing the requested bit rate by the new bit rate in the received reservation cell;

transmitting the reservation cell containing the new bit rate on the outgoing multiplex channel through the network to the second terminal;

adding to the first temporary total an adopted lower new bit rate at the switching nodes through which the routing channel passes in response to an acknowledgement cell that contains the adopted lower new bit rate and that is transmitted by the second terminal on receipt of the reservation cell containing the adopted lower new bit rate; and storing the adopted lower new bit rate in place of the current bit rate.

Accordingly, if the requested bit rate is higher than the current bit rate, i.e. on the occasion of a bit rate increase during a call or the setting up of a call during which the current bit rate is a priori zero, the bit rate increase is not systematically accepted entirely if the difference between the requested bit rate and the current bit rate is less than the bit rate remaining available at that switching node. To the contrary, the bit rate increase will be partially satisfied so as to share the remaining available bit rate with other user terminals requiring to increase their bit rate and associated with routing channels using said outgoing multiplex channel.

The acknowledgement cell which acknowledges receipt of the bit rate increase request by the second terminal imposes the same bit rate in all the switching nodes, which is a priori between zero and the requested bit rate by the first terminal. More precisely, the method wherein, during said step of decreasing, a difference between said new bit rate and said current bit rate is less than a bit rate available at each said switching node equal to said difference between said maximum bit rate of said outgoing multiplex channel and said stored total of bit rates accepted and in process of acceptance and varies substantially in proportion to said available bit rate. In other words, when the requested bit rate is high with respect to the available rate before the bit rate increase request, the new bit rate could be lower. In this way the network guarantees the same low bit rate for any bit rate increase request.

This management of bit rate resources in the network is optimal since if the resource requested exceeds the resource available the difference compared to the maximum resource that can be allocated can be allocated anyway. On the other hand, the invention virtually guarantees a low bit rate for each bit rate increase request.

The invention guards against any loss of acknowledgement cells, i.e. against any lack of confirmation of the adopted lower new bit rate, so that the most recent current bit rate can be retained if any new bit rate is not accepted. The method then comprises the following steps at each switching node:

in place of the step of subtracting, adding the new bit rate to and subtracting the current bit rate from the stored total to provide a second temporary total;

storing the current bit rate in place of an old current bit rate that was allocated to the routing channel previously to allocation of the current bit rate to the routing channel, and storing the new bit rate in place of the current bit rate;

in place of the step of adding, adding the adopted lower new bit rate to and subtracting the new bit rate stored from the second temporary total in response to the acknowledgement cell; and in place of the step of storing, storing the adopted lower new bit rate in place of the new bit rate.

In particular, the invention provides the following steps whereby each switching node reverts to the configuration preceding the bit rate modification request if there is no acknowledgement cell to confirm the modification. These steps comprise:

initiating a predetermined time-delay in response to a reservation cell received at each switching node; and if no acknowledgement cell relating to the routing channel has been received at each switching node before expiry of the predetermined time-delay:

adding the old current bit rate to and subtracting the stored new bit rate from the second temporary total; and storing the old current bit rate in place of the stored new bit rate.

If the expected acknowledgement cell is received after the predetermined time-delay expires, it is destroyed at the switching node.

The predetermined time-delay can be varied in accordance with the number of switching nodes through which the reservation cell received still has to pass between said each switching node and said second terminal.

As in the prior art technique, the reservation method of the invention also provides bit rate decrease requests that are always met. However, this bit rate decrease is again confirmed by an acknowledgement cell containing the requested bit rate as the adopted bit rate by the switching nodes through which the channel passes. Accordingly, if the requested bit rate is lower than the current bit rate, the following steps are effected:

subtracting the current bit rate from the stored total of bit rates accepted and in process of acceptance relating to the other routing channels using the outgoing multiplex channel to provide a third temporary total;

transmitting the received reservation cell containing the requested bit rate on the outgoing multiplex channel through the network to the second terminal;

adding the requested bit rate to the third temporary total in response to an acknowledgement cell that contains the requested bit rate and that is transmitted by the second terminal on receipt of the reservation cell containing the requested bit rate; and storing the requested bit rate in place of the current bit rate.

As already mentioned the invention guards against loss of acknowledgement cells in order to return each switching node to the conditions applying before the bit rate decrease request in the event of a cell being lost. By such a decrease, the method comprises the following steps at each switching node:

subtracting the current bit rate from the stored total of bit rates accepted and in process of acceptance relating to the other routing channels using the outgoing multiplex channel to provide a third temporary total;

transmitting the received reservation cell containing the requested bit rate on the outgoing multiplex channel through the network to the second terminal;

adding the requested bit rate to the third temporary total in response to an acknowledgement cell that contains the requested bit rate and that is transmitted by the second terminal on receipt of the reservation cell containing the requested bit rate; and storing the requested bit rate in place of the current bit rate.

The invention also concerns a bit rate reservation device at a switching node of an asynchronous transfer network designed to implement the method of the invention. It comprises:

first input means receiving reservation cells for extracting respectively from the reservation cells routing channel identifiers and requested bit rates for routing channels using an outgoing multiplex channel from the switching node, second input means receiving acknowledgement cells for extracting respectively from the acknowledgment cells routing channel identifiers, first output means for retransmitting acknowledgement cells, second output means for retransmitting reservation cells on the outgoing multiplex channel, a context memory for storing bit rates read-addressed by the extracted routing channel identifiers respectively, means for subtracting a current bit rate read-addressed in the context memory by the identifier of a given routing channel extracted from a reservation cell received by the first input means, from the requested bit rate extracted from the received reservation cell to provide a difference, means for cumulating bit rates accepted and in the process of acceptance relating to the given routing channels using the outgoing multiplex channel to provide a total, and means responsive to the difference when the difference is positive for weighting the requested bit rate by a negative weighting coefficient that depends on the difference and on the total to provide a new bit rate lower than the requested bit rate, the cumulating means subtracting the current bit rate from the total to provide a first temporary total;

the second output means replacing the requested bit rate by the new bit rate in the received reservation cell to be retransmitted on the outgoing multiplex channel, and the second input means extracting from a received acknowledgement cell a lower new bit rate adopted at the switching nodes of the network through which the given routing channel passes so that the adopted lower new bit rate is added to the first temporary total in the cumulating means and written in place of the current bit rate into the context memory.

In a preferred embodiment of the invention the weighting coefficients are predefined. The weighting means comprises a weighting coefficient memory read-addressed by more significant bits of the total in the cumulating means and more significant bits of the difference, and an adder for adding the negative weighting coefficient read from the weighting memory and the requested bit rate.

The context memory comprises memory locations each having a first part and a second part, data outputs from the first parts being connected directly to data inputs to the second parts, and data outputs from the second parts being connected to data inputs to the first parts through bit rate selecting means. The crossover of data inputs and outputs is useful for transferring bit rates in such a way that a new bit rate is registered by holding the old bit rate, but equally the old bit rate is re-used by cancelling the new bit rate.

For a bit rate increase request, relative to a memory location addressed by the routing channel identifier:

the current bit rate being read in the first part of the memory location to apply it to the subtracting means, the new bit rate provided by the weighting means being added to the total from which the requested bit rate is subtracted in the cumulating means and being written via the bit rate selecting means into the first part of the memory location substantially simultaneously with transfer of the current bit rate from the first part to the second part of the memory location via the data outputs of the first parts and the data inputs of the second parts of the context memory, and the adopted lower new bit rate extracted from the received acknowledgement cell being added to the total in the cumulating means and the new bit rate read in the first part of the memory location being subtracted from the total in the cumulating means, substantially simultaneously with writing of the adopted lower new bit rate in the first part of the memory location through the selecting means.

In response to a negative difference provided by the subtractor means and/or a bit rate decrease request contained in the reservation cell, the context memory stores the requested bit rate extracted from the reservation cell, the cumulating means subtstracts the current bit rate from the total and the second output means transmits the reservation cell with the requested bit rate in response to the difference negative and/or a bit rate decrease request contained in the reservation cell.

In response to an acknowledgment cell received after the reservation cell with the requested bit rate, the cumulating means adds the requested bit rate extracted from the received acknowlegment cell to the total.

The crossed connections between data inputs and data outputs of the context memory are also used relative to a memory location addressed by the routing channel identifier and in response to a negative difference and/or a bit rate decrease request word in the reservation cell. The requested bit rate is added to the total and the current bit rate read in the first part of the memory location is substracted from the total in the cumulating means substantially simultaneously with writing the requested bit rate into the first memory location through the selecting means and transfer of the current bit rate from the first part to the second part of the memory location through the data outputs of the first part and the data input of the second parts of the context memory.

The requested bit rate extracted from the acknowledgement cell is added to the total, and the requested bit rate read in the first part of the memory location is subtracted from the total in the cumulating means substantially simultaneously with writing the requested bit rate extracted from the acknowledgement cell in the first memory location.

A predetermined time-delay is preferably initiated by the reservation cell received by the first input means. If no acknowledgement cell has been received by the second input means, the content of the second part of the memory location is transferred into the first part of the memory location through the data outputs of the second parts of the context memory, the bit rate selecting means and the data inputs of the first parts of the context memory and is added to the total in the cumulating means simultaneously with the subtraction of the content of the first part of the location from the total in the cumulating means at the expiry of a predetermined time-delay initiated by the reservation cell received by the first input means.

Furthermore, the device may comprise means for converting a requested bit rate expressed in a first code contained in a reservation cell into the requested bit rate expressed in a second code applied to the subtracting means and to the context memory, means for converting a new bit rate expressed in the first code provided by the weighting means and applied to the second output means into the new bit rate expressed in the second code applied to the cumulating means and to the context memory, and means for converting a bit rate expressed in the first code contained in an acknowledgement cell into the adopted bit rate expressed in the second code applied to the cumulating means and to the context memory.

The first code is preferably a code requiring fewer bits than the second code in order to release cells to contain other information. The first code is a floating point code and the second code is a fixed point code, for example.

BRIEF DESCRIPTION OF THE DRAWINGS

The foregoing and other objects, features and advantages of the invention will be apparent from the following detailed description of several embodiments of the invention with reference to the corresponding accompanying drawings in which.

DESCRIPTION OF THE PREFERRED EMBODIMENTS

Figure 2:
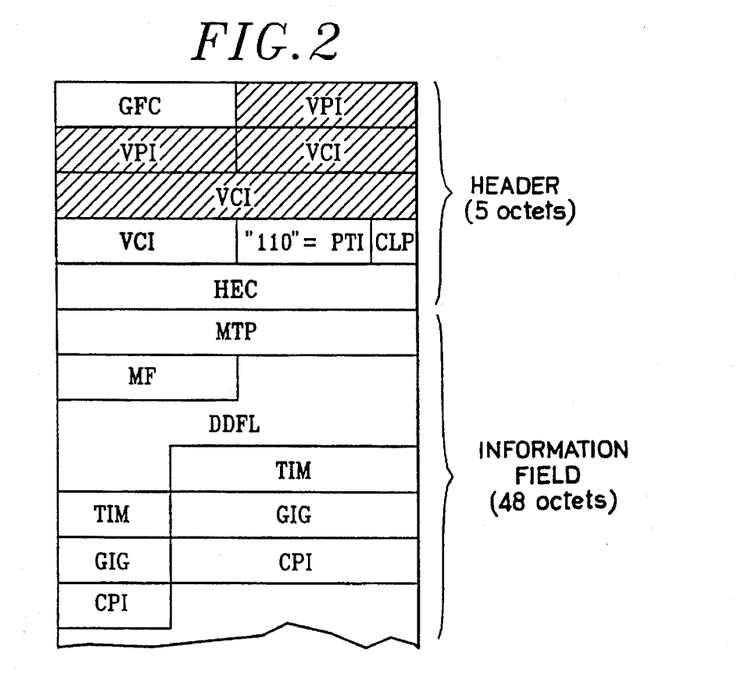
FIG. 2 shows an ATM bit rate reservation cell format of the invention.

Referring to FIG. 2, the transfer entity in an ATM network is a fixed length cell comprising a header of five octets and an information field of 48 octets. Particularly in a bit rate reservation cell conveyed on a logical routing channel between a data source, such as a user terminal, and a user access interface at a local switching node the header comprises:

a generic flow control GFC word on 4 bits;

a virtual path identifier VPI on 8 bits;

a virtual channel identifier VCI on 16 bits;

a payload type indicator word on three bits PTI="110" to indicate a bit rate reservation request followed by a cell loss priority bit CLP; and a header error control octet HEC.

This header format at the user network interface UNI (FIG. 1) is slightly modified at the network-network interface NNI (FIG. 1) between two switching nodes of the network whether each is a switch-over unit or a network switch. At the interface NNI, the field GFC is eliminated and the identifier VPI is lengthened to 12 bits by adding the four bits of the word GFC. The identifiers VPI and VCI identify the channel routing a call, virtual channel and/or virtual path containing the virtual channel on which cells are exchanged between the terminal and another terminal via switching nodes of the ATM network. Hereinafter the combination of the identifiers VPI and VCI is called the "routing channel identifier" VPI/VCI.

A bit rate reservation cell is distinguished from other cells by the code PTI="110" and by additional information contained in the information field constituting the payload of the cell. This additional information includes particularly:

a reservation protocol type word MTP on 8 bits;

a function word MF on 4 bits;

a floating point requested bit rate word DDFL on 9+5=14 bits;

a predetermined time-delay word TIM on 6 bits;

a virtual path jitter tolerance word GIG on 8 bits; and an information protection code word CPI on 8 bits.

The requested bit rate word DDFL indicates a floating point bit rate (FL) expressed as a number of cells per second and made up of a first part representing a mantissa in binary code and a second part representing an exponent in binary code. On the other hand, the bit rate words processed in the bit rate reservation device according to the invention use fixed point notation (FI) to express the bit rates. For example, a DDFL word made up of 9 mantissa bits and 5 exponent bits corresponds to a fixed point requested bit rate word DDFI on 32 bits and expressing one of $2^9 \times 2^5 = 16\,384$ bit rates. Other continuous codes more traditional than the floating point code can be used.

All the parameters and variables processed in the embodiment of the bit rate reservation device described hereinafter are coded in fixed point notation. Words included in the cells are coded in floating point notation (FL): the requested bit rate word DDFL, a new current bit rate word NDFL that is allocated locally by the reservation device and is substituted for the DDFL word in a reservation cell so that it is conveyed to the next switching node, and an adopted bit rate word DRFL which is allocated by the last switching node of the routing channel of the call and which is retransmitted from a "called" terminal to a "calling" terminal in an acknowledgement cell.

The words PTI, MTP and MF differ between a bit rate reservation cell and an acknowledgement cell.

The other parameters and variables processed in the reservation device are as follows and will be treated as interchangeable with fixed point binary words (FI) in the remainder of the description.

DDFI: fixed point requested bit rate by a "calling" terminal, corresponding to the floating point requested bit rate DDFL;

ADCFI: old current bit rate allocated to the routing channel concerned, expressed in fixed point notation, held in memory until the acknowledgement cell is received in order to maintain a coherent condition of bit rate reservations in the network;

DCFI: current bit rate allocated to the routing channel concerned, expressed in fixed point notation;

DELTA: difference between requested bit rate DDFI and current bit rate DCFI;

TDAFI: total bit rates accepted and in process of acceptance, expressed in fixed point notation;

CP: weighting coefficient to be applied to DELTA if DELTA is positive, i.e. for a bit rate increase, to estimate the new current bit rate to be allocated if possible;

NDFI: new current bit rate allocated locally, expressed in fixed point notation, corresponding to the new current bit rate NDFL expressed in floating point notation; and DRFI: finally adopted bit rate, expressed in fixed point notation, corresponding to the adopted bit rate DRFL expressed in floating point notation, finally allocated by the last switching node of the routing channel concerned.

Figure 3:
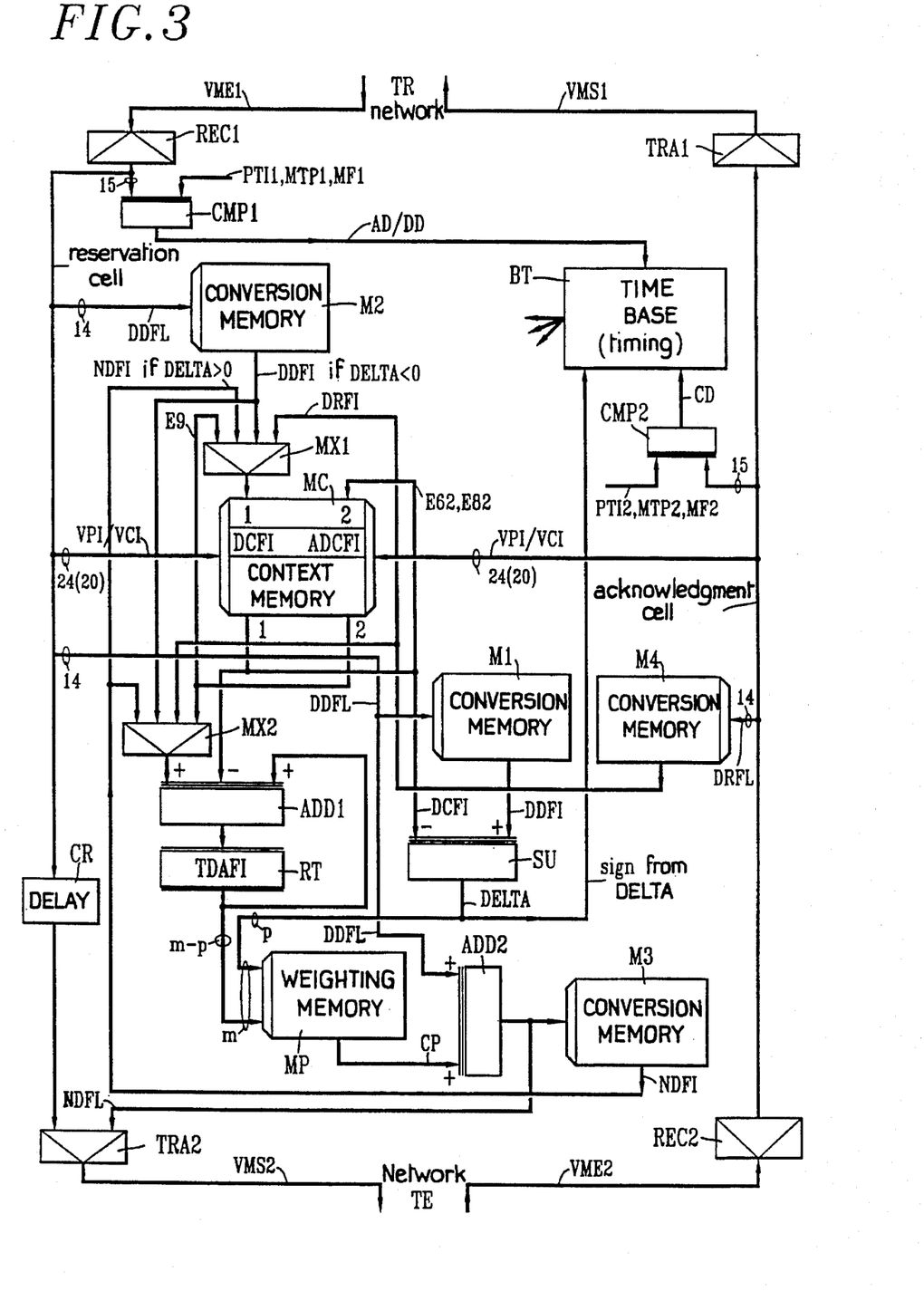
FIG. 3 is a block diagram of a bit rate reservation device of the invention at an ATM network switching node.

The bit rate reservation device of the invention, shown in FIG. 3, is located at a switching node as an ATM switch 20, 21, 22 or an ATM switch-over unit 10, 11, 12 (FIG. 1), between a plurality of incoming ATM digital multiplex channels and a plurality of outgoing ATM digital multiplex channels associated in pairs of incoming and outgoing channels constituting virtual paths to other switching nodes. Reference will be made hereinafter to a logical connection via a routing channel through switching nodes between two terminals. The first terminal is called the "calling" terminal TR and the second terminal is called the "called" terminal TE. The logical connection is intended for a one-way call to transmit data from the calling terminal TR to the called terminal TE or data from the called terminal TE to the calling terminal TR, or for a two-way call to exchange data between both terminals TR and TE as described with reference to FIGS. 1, 3 and 4 in U.S. Pat. No. 5,081,620. It will be assumed hereinafter that the requested bit rate is fixed by the calling terminal TR either when setting up the call or during the call.

To simplify FIG. 3, only two pairs of incoming and outgoing digital multiplex channels VME1 and VMS1, VME2 and VMS2 involved in routing the call are shown. All other means of processing cells known in the prior art are omitted, in particular the means for effecting switching at the switching node.

The first incoming channel VME1 receives a bit rate reservation request cell directly from the calling terminal TE if the switching node is the local switch of the terminal TE, or receives it indirectly via the switching network. The requested bit rate DDFL included in the bit rate reservation cell is equal to the requested bit rate by the terminal TE if the switching node is the local switch of the terminal TE, or equal to a new current bit rate NDFL allocated by the switching node preceding the switching node concerned on the forward channel from TR to TE in the routing channel concerned. The second incoming channel VME2 receives an acknowledgement cell in which the information field contains, in place of the bit rate DDFL, the adopted bit rate DRFL retransmitted by the called terminal TE on the backward channel from TE to TR in the concerned routing channel in order to impose the adopted bit rate on all the switching nodes through which the routing channel passes. The first outgoing multiplex channel VMS1 is associated in parallel with the incoming channel VME1 and retransmits the acknowledgement cell to the next switching node, if there is one, or to the calling terminal, using the backward routing channel from TE to TR. The outgoing multiplex channel VMS2 is associated in parallel with the incoming channel VME2 and serves the switching node following the concerned switching node along the forward routing channel from TR to TE, or the called terminal TE if the concerned switching node is the local switch of the called terminal TE.

Each of the incoming multiplex channels VME1, VME2 is connected to a receive circuit REC1, REC2 known in itself and implementing all receive functions of an ATM multiplex channel, including synchronization of received cells to a local clock in the concerned switching node, serial-parallel conversion of cells, error control, switching of cells between multiplex channels, etc.

A cell on the multiplex channel VME1 received by the circuit REC1 is supplied by a bus of 53×8 bits in part to 3+8+4=15 first inputs of a first comparator circuit CMP1, in part to 14-terminal read address ports of two conversion memories M1 and M2, and in full to a first input port of a transmit circuit TRA2 via a predetermined time-delay circuit CR. This circuit CR delays each received cell by the processing time in the bit rate reservation device so that in response to a received bit rate reservation cell the reservation device estimates the new bit rate NDFL according to DELTA and TDAFI, in particular, and writes it in the information field of the reservation cell in place of the bit rate DDFL requested by the terminal TR or the preceding switching node in the event of a bit rate increase request. To this end the transmit circuit TRA2 has a second 14-terminal input port to which a third conversion memory M3 applies the new bit rate word NDFL. The transmit circuit TRA2 performs notably a multiplexing of a bit rate reservation cell with the word NDFL in order to transmit a reservation cell with the new bit rate on the outgoing multiplex channel VMS2 if the reservation cell indicates a bit rate increase.

A cell received by the second receive circuit REC2 is applied in part to 15 first inputs of a second comparator circuit CMP2 and to a 14-terminal read address port of a fourth conversion memory M4 and in full to another transmit circuit TRA1 connected to the outgoing multiplex channel VMS1.

The comparator circuits CMP1 and CMP2 compare combinations of words PTI, MTP and MF included in the respective cells received with predetermined first and second combinations (PTI1, MTP1, MF1) and (PTI2, MTP2, MF2) supplied by programmable read-only memories. The first comparator circuit CMP1 detects the first combination if the cell received by the receive circuit REC1 is a bit rate reservation request cell, i.e. a reservation cell in which the requested bit rate DDFL is different than, i.e. greater than or less than, the corresponding current bit rate allocated to the concerned routing channel. The reservation is indicated by the word PTI ="110". The distinction between a bit rate increase and a bit rate decrease is introduced into the function word MF. For example, a bit rate increase is indicated by a predetermined function word MF=MF1 in the received reservation cell. The comparator circuit CMP1 generates a bit rate increase signal AD which enables bit rate processing operations in most of the memories and other circuits included in the reservation device, except for the memories M2 and M4. On the other hand, if the comparator circuit CMP1 detects the words PTI1 and MTP1 in a cell received by the circuit REC1 and containing a word MF=MF2 different than MF1, the comparator circuit CMP1 produces a bit rate decrease signal DD. The second predetermined combination (PTI2, MTP2, MF2) is detected in an acknowledgement cell received by the second receive circuit REC2 and to be retransmitted by the circuit TRA1. The circuit REC2 then generates a bit rate confirmation signal CD which enables memorization of the adopted bit rate DRFI in a context memory MC.

In practise, the signals AD/DD and CD are applied to a time base BT which generates all the clock signals needed for processing a bit rate increase/decrease and a bit rate confirmation in the memories and circuits of the bit rate reservation device. The time base BT contributes to synchronization of cells received in the circuits REC1 and REC2 and cells to be transmitted on the outgoing multiplex channels VMS1 and VMS2 by the transmit circuits TRA1 and TRA2. The time base BT may include a known multiple timer device.

Each of the memories M1, M2, M3 and M4 is a PROM memory which converts a floating point bit rate into a fixed point bit rate by virtue of the correspondence between a read address equal to the floating point bit rate word and the fixed point bit rate word stored in a respective location of the memory.

The memories M1 and M2 convert the 14-bit floating point requested bit rate word DDFL contained in a bit rate reservation cell received by the receive circuit REC1 into a fixed point requested bit rate word DDFI which is applied respectively to positive inputs of a subtractor SU and to third inputs of a first multiplexer MX1 and second inputs of a second multiplexer MX2. The two memories M1 and M2 are shown separately because the words DDFI are read in these memories at different times in the reservation process described hereinafter. Nevertheless, the two memories M1 and M2 can be combined into a single conversion memory by time-sharing reading at the same read address.

The memory M3 converts a floating point new bit rate word NDFL supplied by an adder ADD2 and applied to the second input port of the transmit circuit TRA2 into a fixed point bit rate word NDFI applied to second inputs of the first multiplexer MX1 and to first inputs of the second multiplexer MX2.

The last conversion memory M4 converts a floating point adopted bit rate word DRFL contained in an acknowledgement cell received by the second receive circuit REC2 into a fixed point adopted bit rate word DRFI applied to fourth inputs of the first multiplexer MX1 and third inputs of the second multiplexer MX2.

The first multiplexer MX1 also has first inputs connected to fourth inputs of the second multiplexer MX2 and to second data outputs of the context memory MC, the first data inputs of which are connected to outputs of the multiplexer MX1. First data outputs of the memory MC are connected to the second data inputs of the memory MC and to negative inputs of an adder ADD1 and negative inputs of the subtractor SU.

The context memory MC contains locations having first and second parts addressed by the routing channel identifiers VPI/VCI included in the reservation cells and acknowledgement cells transmitted by the receive circuits REC1 and REC2. A first memory location part corresponds to the first data inputs and outputs to store the current bit rate word DCFI selected from four such words in multiplexer MX1. A second memory location part corresponds to the second data inputs and outputs to store the old current bit rate word ADCFI allocated to the routing channel prior to a bit rate increase/decrease request.

The memory MC thus implements a crossover between the second data outputs and the first data inputs, on the one hand, and the first data outputs and the second data inputs, on the other hand, in order to transfer bit rate words between the first and second parts of each context memory location in both directions. The content of the first part of the memory location can be transferred into the second part of the memory location in response to a bit rate increase/decrease request in order to regard the current bit rate DCFI temporarily as the old bit rate ADCFI. Conversely, the content of the second part of the memory location can be transferred into the first part of the memory location if no acknowledgement cell is received after a predetermined time-delay set by the time base BT, in order to substitute the old current bit rate ADCFI=DCFI preceding the bit rate increase/decrease request for a new requested bit rate NDFI or an unconfirmed requested bit rate DDFI.

The bit rate reservation device further includes a totalizing register RT and a weighting memory MP which, in conjunction with the memories M1 and M3, the adders ADD1 and ADD2 and the subtractor SU, constitute means for estimating a new bit rate NDFI on the basis of the requested bit rate DDFI if the latter is higher than the current bit rate DCFI.

The totalizing register RT is connected to the outputs of the adder ADD1 which has first positive inputs connected to the outputs of the multiplexer MX2 and second positive inputs connected to the outputs of the totalizing register. The totalizing register cumulates all the already accepted bit rates TDAFI on the outgoing multiplex channel VMS2, including:

any new bit rate in process of acceptance NDFI applied by the first inputs of the multiplexer MX2 if a requested bit rate increase is in process of acceptance by the network, and any requested bit rate DDFI applied by the second inputs of the multiplexer MX2 if a bit rate decrease request is in process of acceptance by the network.

The negative inputs of the adder ADD1 are used to subtract the current bit rate DCFI read in the context memory MC and becoming the old bit rate in the event of a bit rate increase/decrease request and also to subtract the new bit rate NDFI or the requested bit rate DDFI read from context memory MC simultaneously with addition of the adopted bit rate DRFI after acceptance of the bit rate increase/decrease, or simultaneously with addition of an old bit rate ADCFI after a predetermined predetermined time-delay indicating non-acceptance of the bit rate modification.

The weighting memory MP contains weighting coefficients CP which temper the bit rate increases requested indicated by positive DELTA=DDFI-DCFI transmitted by the subtractor SU particularly when the total TDAFI of bit rates already accepted is high. To this end the weighting memory MP is addressed by read addresses on m bits. Each read address includes a more significant bit (MSB) first part which is made up of (m-p) more significant bits of the bit rate total TDAFI from the totalizing register RT and a less significant bit second part which is made up of p more significant bits of the difference DELTA supplied by the subtractor SU, the integer m being greater than the integer p. The first part on (m–p) bits addresses weighting coefficient CP pages respectively associated with bit rate totals. The second part on p bits addresses weighting coefficients CP which vary the weighting in each of the preceding pages. The coefficient CP read as a result of this addressing is applied by a data output of the weighting memory MP to first inputs of the second adder ADD2. The coefficient CP usually has a negative sign bit in order to reduce the requested bit rate DDFL in the adder ADD2 to a new bit rate NDFL lower than the bit rate DDFL but greater than or equal to the current bit rate DCFL.

The coefficient CP read can be a null coefficient if a bit rate decrease is requested, i.e. if the difference DELTA=DDFI–DCFI is negative, in order to maintain the same requested bit rate DDFL at the output of the adder ADD2, although this is not strictly necessary.

Figure 4:
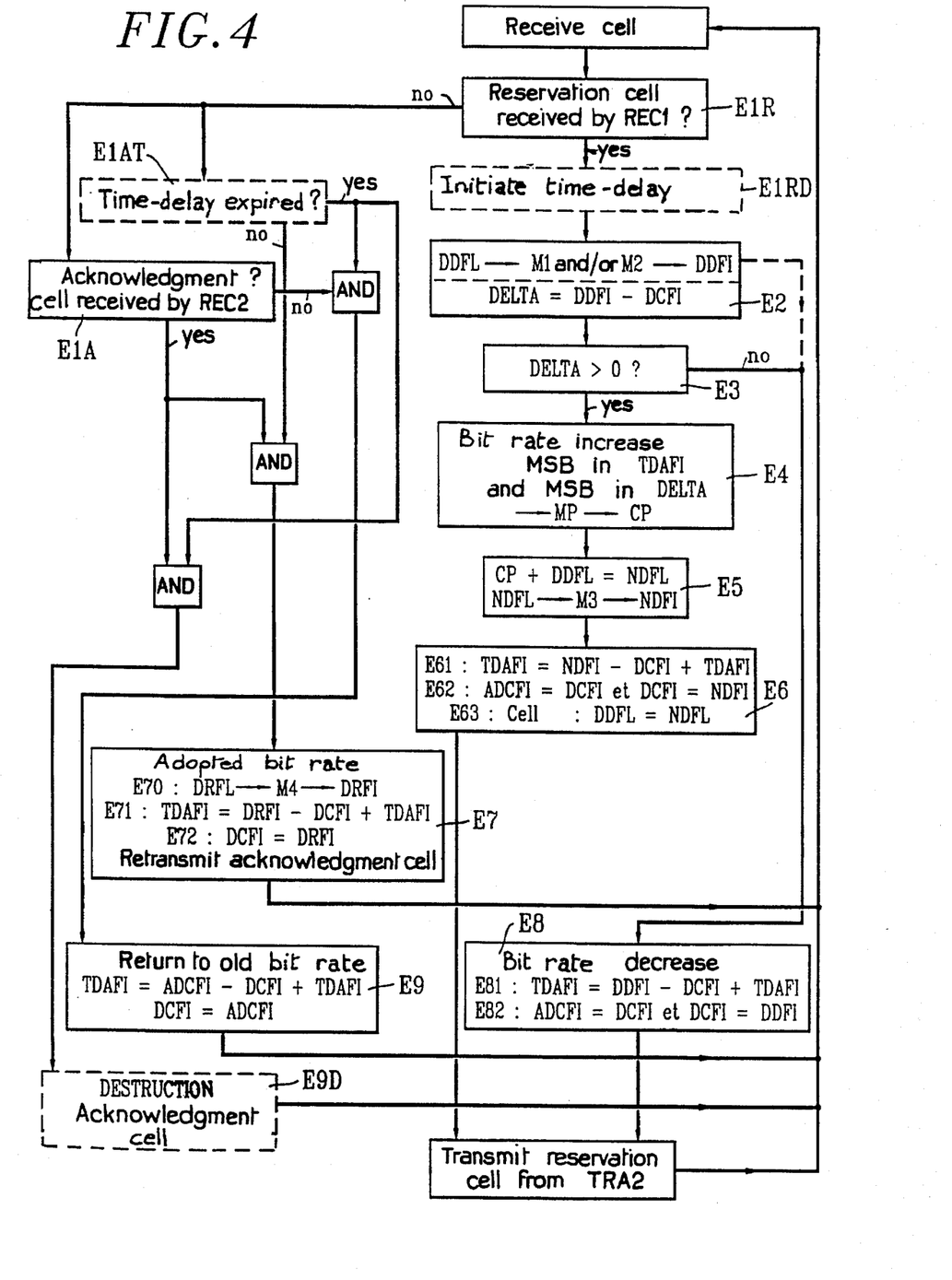
FIG. 4 is a flow chart for the bit rate reservation method of the invention.

The bit rate reservation method of the invention implemented in the bit rate reservation device at a given switching node of the asynchronous transfer mode network ATM shown in FIG. 3 is described below with reference to FIG. 4. The method applies to a call that has yet to be set up or that has already been set up.

It is assumed firstly that a reservation cell transmitted by the calling terminal TR, possibly modified in switching nodes preceding the given node, and received by the first receive circuit REC1 contains a bit rate increase word MF. In the first step E1R, the word MF produces a signal AD applied by the first comparator circuit CMP1 to the time base BT which successively controls reading and writing in the memories and operations in the circuits of the reservation device in the subsequent steps E2 through E6.

In the second step E2, the floating point requested bit rate word DDFL contained in the received reservation cell is the read address for reading the respective fixed point requested bit rate word DDFI in the conversion memory M1. The respective current bit rate word DCFI present at this time in a first location part of the context memory MC, representing the bit rate of the call concerned, which may be already in progress, is also read in response to addressing by the routing channel identifier VPI/VCI in the reservation cell received. The words DDFI and DCFI read in the memories M1 and MC are applied to the subtractor SU which calculates the fixed point difference DELTA=DDFI–DCFI, the sign bit of which is applied to the time base BT. As already mentioned, the bit rate increase/decrease indication in the word MF of a reservation cell is not strictly necessary, since this indication is supported by the sign bit of the difference DELTA.

The time base BT tests the sign bit of DELTA in step E3 and commands the subsequent three steps E4, E5 and E6 if the DELTA signal is positive and therefore corresponds to a bit rate increase request.

Prior to step E4, the total TDAFI in the totalizing register RT concerns bit rates that have been accepted and are in process of acceptance before reception of the reservation cell concerned and correspond to other call routing channels using the output multiplex channel VMS2. The (m–p) more significant bits of the total TDAFI and the p more significant bits of the difference DELTA are applied to the weighting memory MP as more significant bits and less significant bits of a read address. The memory MP supplies the respective weighting coefficients CP to the first inputs of the adder ADD2. The memory MP thus contributes to modulation of a weighting as a function of both the bit rate TDAFI already reserved and in process of being reserved on the multiplex channel VMS2 and the requested bit rate increase DELTA>0. A few address bits of the memory MP are found to be sufficient, for example p=7 and m=14. The coefficient CP can be equal to 0 if the bit rate total TDAFI read in the register RT is relatively low, indicating low occupancy of the outgoing multiplex channel VMS2, and/or if the bit rate increase DELTA is relatively low in comparison with the bit rate total. Regardless of the bit rate increase, the coefficient CP is selected so as always to leave a minimum bit rate resource for other future or in progress calls on the channel VMS2. In other words, the sum of the total TDAFI–DCFI and the bit rate in process of acceptance NDFI, less than or equal to DDFI, is always less than a maximum bit rate that the outgoing multiplex channel VMS2 can accept.

This is why, usually, and especially in heavy traffic periods, the coefficient CP is negative so as to change the requested bit rate DDFL included in the reservation cell into a locally requested new bit rate NDFL produced by the adder ADD2 in step E5. The floating point new bit rate NDFL, which is lower than the initially requested bit rate DDFL, is converted into a fixed point new bit rate word NDFI in the memory M3 addressed by the result CP+DDFL produced by the adder ADD2 and is applied to the second inputs of the transmitter TRA2.

The next step E6 comprises three virtually simultaneous substeps E61, E62 and E63.

The first substep E61 updates the bit rate total TDAFI by cumulating to it the negative difference NDFI–DCFI between the new bit rate NDFI, which is applied by the memory M3 via the multiplexer MX2 to the first positive inputs of the adder ADD1, and the current bit rate DCFI which precedes this current bit rate reservation and is applied to the negative inputs of the adder ADD1 by reading the first part of the location of the memory MC addressed by the identifier VPI/VCI. Because the outputs of the totalizing register RT are looped to the second positive inputs of the adder ADD1, the latter writes the result NDFI–DCFI+TDAFI into the register RT which holds it temporarily, until an acknowledgement cell is received or until the predetermined predetermined time-delay expires without any acknowledgement cell being received, as indicated below.

The second substep E62 saves the new bit rate NDFI in the respective location of the context memory MC already addressed in step E2 and in substep E61. The initial current bit rate DCFI is moved into the second part of this location so that this bit rate is temporarily interpreted as an old bit rate ADCFI and subsequently kept as the current bit rate should any new bit rate equal to or less than NDFI not be accepted and confirmed by the network along the routing channel concerned, or in the event that the predetermined predetermined time-delay expires. At the same time, the new bit rate NDFI is written via the second inputs of the multiplexer MX1 into the first part of the respective location of the context memory MC.

Finally, the third substep E63 replaces the requested bit rate word DDFL included in the information field of the reservation cell passing through the predetermined time delay circuit CR, by the new bit rate word NDFL produced by the adder ADD2. This replacement is done in the transmit circuit TRA2 in order to transmit the thus modified reservation cell via the multiplex channel VMS2 to the next switching node of the ATM network along the virtual routing channel of the call concerned, or directly to the called terminal TE if the node to which FIGS. 3 and 4 relate is the local switch of the second terminal TE.

At each of the successive subsequent nodes, if any, through which the reservation cell passes, the bit rate indicated in that cell is again examined in comparison with the instantaneous total bit rate accepted and in process of acceptance at each node relative to the corresponding outgoing multiplex channel. The bit rate examined is retained or, more usually, decreased so that the last of the subsequent nodes transmits to the called terminal TE a bit rate DRFL finally adopted by the network which is a priori lower than the new bit rate NDFL locally accepted at the node concerned, and is rarely equal to the bit rate NDFL, or even to the bit rate DDFL requested initially by the calling terminal TR or one of the nodes preceding the node concerned.

The called terminal TE sends back a bit rate acknowledgement cell which is examined at successive switching nodes up to the calling terminal TR so that all the nodes adopt the adopted bit rate DRFL as the current bit rate DCFL of the routing channel concerned. This bit rate adoption is accomplished by effecting steps E1A and E7 at each node, and precedes the effective change of bit rate ordered by the calling terminal TR.

The acknowledgement cell, which is different from a reservation cell, is extracted from the multiplex channel VME2 by the receive circuit REC2 and applied to the first inputs of the comparator circuit CMP2 and to the read address inputs of the conversion memory M4 and the context memory MC. In step E1A the comparator circuit CMP2 recognizes the acknowledgement cell and applies the bit rate confirmation signal CD to the time base BT which in the next step E7 controls reading and writing in the memories M4 and MC and the totalizing register RT, the other memories M1, M2, M3 and MP not being involved.

Step E7 comprises three virtually simultaneous substeps E70, E71 and E72.

In substep E70 the floating point adopted bit rate word DRFL included in the acknowledgement cell received is converted into a fixed point bit rate word DRFI read in the memory M4.

The next substep E71 concerns updating of the bit rate total TDAFI. The read word DRFI is applied via the third inputs of the multiplexer MX2 to the first positive inputs of the adder ADD1. The negative inputs of the adder ADD1 receive the new bit rate NDFI as the current bit rate in process of acceptance DCFI previously written into the memory MC in the reservation substep E62. The bit rate NDFI is read in a first location part of the memory MC addressed by the routing channel identifier VPI/VCI contained in the acknowledgement cell received. In the adder ADD1, the bit rate total TDAFI most recently calculated in substep E61 is updated by the cumulative operation:

$$TDAFI=DRFI-DCFI+TDAFI$$

so as to subtract the new bit rate initially adopted locally DCFI=NDFI and to add the bit rate finally adopted DRFI in the bit rate total written into the totalizing register RT.

The adopted bit rate word DRFI read in the conversion memory M4 is also applied to the first inputs of the context memory MC via the fourth inputs of the multiplexer MX1 in substep E72. The adopted bit rate word DRFI is written into the first part of the location in the memory MC previously addressed so that the current bit rate shortly becomes the adopted bit rate.

After the adopted bit rate DRFI has been stored in context memory MC in all the switching nodes of the routing channel concerned and the acknowledgement cell has been received by the calling terminal TR, the latter changes from the current bit rate DCFI to the adopted bit rate DRFI and proceeds to transmit cells at the adopted bit rate DRFI.

In a similar way to what has already been described in relation to steps E1R, E2 and E3, a bit rate decrease indicator word MF included in a bit rate reservation cell received by the first receive circuit REC1 initiates a bit rate decrease in the time base BT in response to the logic signal DD produced by the first comparator circuit CMP1 (step E1R). The time base BT commands a read operation in the conversion memory M2 in order to convert the floating point requested bit rate DDFL included in the bit rate reservation cell received into the fixed point requested bit rate DDFI (step E2). Immediately after step E2, step E8 replacing steps E4, E5 and E6 as shown by the dashed line in FIG. 4 is accomplished.

As already mentioned, the bit rate variation indicator word MF is not strictly necessary. Whether this word MF is included in the reservation cell received or not, step E2 can be completed by converting the bit rate DDFL into the bit rate DDFI in the conversion memory M1 and by calculating the difference DELTA=DDFI–DCFI between the bit rate DDFI read in the memory M1 and the bit rate DCFI read in a first location part in the context memory MC addressed by the routing channel indicator VPI/VCI included in the reservation cell received. The sign bit of the difference DELTA produced by the subtractor SU, which is a negative sign in this instance, is supplied to the time base BT in step E3 to initiate the next step E8 which is substantially the same as step E6. In step E8, weighting means including the weighting memory MP, the second adder ADD2 and the converter memory M3 are not involved since a bit rate decrease request is never contested.

Step E8 comprises two virtually simultaneous substeps E81 and E82.

Substep E81 updates the total of the bit rates accepted and in process of acceptance TDAFI for calls conveyed by the output multiplex channel VMS2. This update is commanded by the time base BT which selects second inputs of the multiplexer MX2 and controls a read operation at the location of the context memory MC addressed by the identifier VPI/VCI in the reservation cell concerned. The requested bit rate DDFI read in the memory M2 is applied to the first positive inputs of the adder ADD1 and the current bit rate DCFI read in the memory MC is applied to the negative inputs of the adder ADD1. The result of the operation DDFI–DCFI+TDAFI is written into the totalizing register RT to update the total of the bit rates accepted and in process of acceptance.

After selecting third inputs of the multiplexer MX1 at the same time as second inputs of the multiplexer MX2, the requested bit rate DDFI read in memory M2 is written into the first location part of the context memory MC addressed by the routing channel identifier VPI/VCI in substep E82. At the same time the current bit rate DCFI preceding the reservation request is moved into the second part of the addressed location in the memory MC, as the old current bit rate ADCFI.

Then, the bit rate reservation cell with the requested bit rate DDFI unchanged, after conventional processing in the transmit circuit TRA2, is transmitted on the outgoing multiplex channel VMS2 to the next switching node towards the called terminal TE or directly to the called terminal TE, as appropriate. As previously in step E7, the bit rate total TDAFI is updated in the totalizing register RT (substep 71), and the bit rate finally adopted DRFI which is retransmitted in an acknowledgement cell by the called terminal TE and which is a fortiori equal to the requested bit rate DDFI lower than the current bit rate DCFI is written into the context memory MC, in response to the acknowledgement cell at each of the switching nodes of the routing channel concerned. On receiving the acknowledgement cell, the calling terminal TR decides to transmit cells at the bit rate actually adopted DRFI=DDFI.

Detection of a bit rate reservation cell by the first comparator circuit CMP1 preferably starts a predetermined time-delay in the time base BT (step E1RD; FIG. 4). The predetermined time-delay defines a predetermined period that must not be exceeded for receiving the acknowledgement cell that should follow on from the reservation cell. This protects the switching node against loss of any reservation cell transmitted as far as the called terminal TE or any acknowledgement cell transmitted from the called terminal TE to a switching node.

The duration of the predetermined time-delay can be the same at all switching nodes. In a different embodiment of the invention, the duration of the predetermined time-delay at each node is calculated according to the identifier VPI/VCI contained in the reservation cell received, i.e. according to the chosen outgoing multiplex channel VMS2. In a further embodiment of the invention, the predetermined time-delay is determined on the basis of a distance word identical to the predetermined time-delay word TIM included in the reservation cell and indicating the number of switching nodes that the reservation cell has to pass through before it reaches the called terminal TE, this number being decremented by one on passing through each node.

If the acknowledgement cell expected in response to the bit rate reservation cell (bit rate increase/decrease request) is detected in step E1A by the comparator circuit CMP2 before the predetermined time-delay expires (step E1AT), step E7 is effected normally.

On the other hand, if no acknowledgement cell has been received when the predetermined time-delay expires (step E1AT=YES AND step E1A=NO; FIG. 4), the totalizing register RT and the context memory MC are reset to their state preceding the bit rate reservation request, in step E9. The time base BT sets the fourth inputs of the multiplexer MX2 and controls reading of the first location part in the context memory MC addressed in write mode in substep E62 or E82. The adder ADD1 adds the old current bit rate ADCFI to and subtracts either the new bit rate NDFI that is not adopted for a further bit rate increase, or the requested bit rate DDFI not adopted for a bit rate decrease request, as the current bit rate DCFI, from the total of the bit rates accepted and in process of acceptance TDAFI in the totalizing register RT. The time base BT then selects the first inputs of the multiplexer MX1 connected to the second outputs of the context memory MC to effect a transfer in the opposite direction to that effected in substep E62 or E82. The old bit rate ADCFI read in the second part of the memory location addressed is then written into the first part of that memory location, as the re-established current bit rate.

Any acknowledgement cell relating to the current bit rate reservation received after the predetermined time-delay expires is destroyed (step E9D; FIG. 4).

What we claim is:

1. A method of bit rate reservation at switching nodes of an asynchronous transfer mode network through which passes a routing channel having a current bit rate stored at said nodes and extending between first and second terminals, a reservation cell being received in each switching node, said reservation cell containing a requested bit rate, having been transmitted from said first terminal through said network and being retransmitted on an outgoing multiplex channel from each said switching node having a maximum bit rate through said network to said second terminal, and an acknowledgement cell being received by each said switching node, said acknowledgment cell being transmitted from said second terminal to said first terminal through said network in response to said reservation cell retransmitted on said outgoing multiplex channel, said method comprising the following steps effected at each said switching node if said requested bit rate contained in said reservation cell received by each said switching node is greater than said current bit rate:

decreasing said requested bit rate as function of a difference between said requested bit rate and said current bit rate and a stored total of bit rates accepted and in process of acceptance relating to other routing channels using said outgoing multiplex channel to provide a new bit rate lower than said requested bit rate, even when the difference between said requested bit rate and said current bit rate is higher than the difference between said maximum bit rate of said outgoing multiplex channel and said stored total;

subtracting said current bit rate from said stored total to provide a first temporary total;

replacing said requested bit rate by said new bit rate in said received reservation cell;

transmitting said reservation cell containing said new bit rate on said outgoing multiplex channel through said network to said second terminal;

adding to said first temporary total an adopted lower new bit rate at said switching nodes through which said routing channel passes in response to an acknowledgement cell that contains said adopted lower new bit rate and that is transmitted by said second terminal on receipt of said reservation cell containing said adopted lower new bit rate; and storing said adopted lower new bit rate in place of said current bit rate.

2. The method claimed in claim 1 wherein, during said step of decreasing, a difference between said new bit rate and said current bit rate is less than a bit rate available at each said switching node equal to said difference between said maximum bit rate of said outgoing multiplex channel and said stored total of bit rates accepted and in process of acceptance and varies substantially in proportion to said available bit rate.

3. The method claimed in claim 1 wherein the following steps are effected at each said switching node:

in place of said step of subtracting, adding said new bit rate to and subtracting said current bit rate from said stored total to provide a second temporary total;

storing said current bit rate in place of an old current bit rate that was allocated to said routing channel previously to allocation of said current bit rate to said routing channel, and storing said new bit rate in place of said current bit rate;

in place of said step of adding, adding said adopted lower new bit rate to and subtracting said new bit rate stored from said second temporary total in response to said acknowledgement cell; and in place of said step of storing, storing said adopted lower new bit rate in place of said new bit rate.

4. A method as claimed in claim 1 comprising the following steps effected at each said switching node if said requested bit rate included in said reservation cell received by each said switching node is less than said current bit rate:

subtracting said current bit rate from said stored total of bit rates accepted and in process of acceptance relating to said other routing channels using said outgoing multiplex channel to provide a second temporary total;

transmitting said received reservation cell containing said requested bit rate on said outgoing multiplex channel through said network to said second terminal;

adding said requested bit rate to said second temporary total in response to an acknowledgement cell that contains said requested bit rate and that is transmitted by said second terminal on receipt of the reservation cell containing said requested bit rate; and storing said requested bit rate in place of said current bit rate.

5. The method claimed in claim 4 wherein the following steps are effected at each said switching node:

in place of said step of subtracting step in claim 4, adding said requested bit rate to and subtracting said current bit rate from said stored total to provide a third temporary total;

storing said current bit rate in place of an old current bit rate that was allocated to said routing channel previously to allocation of said current bit rate to said routing channel and storing said requested bit rate in place of said current bit rate; and in place of said step of adding in claim 4, adding said requested bit rate contained in said acknowledgement cell to and subtracting said stored requested bit rate from said third temporary total in response to said acknowledgement cell.

6. A method as claimed in claim 1 comprising:

a prior step of calculating a second difference between said requested bit rate contained in the received reservation cell and said stored current bit rate in order to extract a sign of said second difference, effecting said following steps if said sign of said second difference is positive, and if said sign of said second difference is negative:

subtracting said current bit rate from said stored total of bit rates accepted and in process of acceptance relating to said other routing channels using said outgoing multiplex channel to provide a second temporary total;

transmitting said received reservation cell containing said requested bit rate on said outgoing multiplex channel through said network to said second terminal;

adding said requested bit rate to said second temporary total in response to an acknowledgement cell that contains said requested bit rate and that is transmitted by said second terminal on receipt of the reservation cell containing said requested bit rate; and storing said requested bit rate in place of said current bit rate.

7. A method as claimed in claim 1 comprising:

a prior step of detecting a bit rate modification word in said received reservation cell, effecting said following steps if said bit rate modification word contains a bit rate increase request, and if said bit rate modification word contains a bit rate decrease request:

subtracting said current bit rate from said stored total of bit rates accepted and in process of acceptance relating to said other routing channels using said outgoing multiplex channel to provide a second temporary total;

transmitting said received reservation cell containing said requested bit rate on said outgoing multiplex channel through said network to said second terminal;

adding said requested bit rate to said second temporary total in response to an acknowledgement cell that contains said requested bit rate and that is transmitted by said second terminal on receipt of the reservation cell containing said requested bit rate; and storing said requested bit rate in place of said current bit rate.

8. A method as claimed in claim 3 comprising the following steps:

initiating a predetermined time-delay in response to said reservation cell received at each said switching node; and if no acknowledgement cell relating to said routing channel has been received at each said switching node before expiry of said predetermined time-delay:

adding said old current bit rate to and subtracting said stored new bit rate from said second temporary total; and storing said old current bit rate in place of said stored new bit rate.

9. A method as claimed in claim 5 comprising the following steps:

adding said old current bit rate to and subtracting said stored requested bit rate from said third temporary total; and storing said old current bit rate in place of said bit rate requested.

10. The method claimed in claim 8 comprising a step of destroying said acknowledgement cell transmitted by said second terminal if said acknowledgment cell is received at each said switching node after expiry of said predetermined time-delay.

11. The method claimed in claim 10 wherein said predetermined time-delay is varied according to the number of switching nodes that said reservation cell received still has to pass through between each said switching node and said second terminal.

12. A bit rate reservation device at a switching node of an asynchronous transfer mode network, comprising:

first input means receiving reservation cells for extracting respectively from said reservation cells routing channel identifiers and requested bit rates for routing channels using an outgoing multiplex channel from said switching node, second input means receiving acknowledgement cells for extracting respectively from said acknowledgement cells routing channel identifiers, first output means for retransmitting said acknowledgement cells, second output means for retransmitting reservation cells on said outgoing multiplex channel, a context memory for storing bit rates read-addressed by said extracted routing channel identifiers respectively, means for subtracting a current bit rate read-addressed in said context memory by said identifier of a given routing channel extracted from a reservation cell received by said first input means, from the requested bit rate extracted from said received reservation cell to provide a difference, means for cumulating bit rates accepted and in the process of acceptance relating to said given routing channels using said outgoing multiplex channel to provide a total, and means responsive to said difference when said difference is positive for weighting said requested bit rate by a negative weighting coefficient that depends on said difference and on said total to provide a new bit rate lower than said requested bit rate, said cumulating means subtracting said current bit rate from said total to provide a first temporary total;

said second output means replacing said requested bit rate by said new bit rate in said received reservation cell to be retransmitted on said outgoing multiplex channel, and said second input means extracting from a received acknowledgement cell a lower new bit rate adopted at said switching nodes of said network through which said given routing channel passes so that said adopted lower new bit rate is added to said first temporary total in said cumulating means and written in place of said current bit rate into said context memory.

13. The device claimed in claim 12 wherein said weighting means comprises a weighting coefficient memory read-addressed by more significant bits of said total in said cumulating means and more significant bits of said difference, and an adder for adding said negative weighting coefficient read from said weighting memory and said requested bit rate.

14. The device claimed in claim 12 wherein:

said cumulating means both adds said requested bit rate to and subtracts said current bit rate read from said context memory from said total, and said context memory stores said new bit rate in place of said current bit rate in response to said received reservation cell, and said cumulating means adds said adopted lower new bit rate to and subtracts said new bit rate from said total, and said context memory stores said adopted lower new bit rate in place of said new bit rate in response to said received acknowledgement cell.

15. The device claimed in claim 12 wherein said context memory comprises memory locations each having a first part and a second part, data outputs from said first parts being connected directly to data inputs to said second parts, and data outputs from said second parts being connected to data inputs to said first parts through bit rate selecting means, relative to a memory location addressed by the identifier of said given routing channel:

said current bit rate being read in the first part of said memory location to apply it to said subtracting means, said new bit rate provided by said weighting means being added to said total from which said requested bit rate is subtracted in said cumulating means and being written via said bit rate selecting means into said first part of said memory location substantially simultaneously with transfer of said current bit rate from said first part to said second part of said memory location via said data outputs of said first parts and said data inputs of said second parts of said context memory, and said adopted lower new bit rate extracted from said received acknowledgement cell being added to said total in said cumulating means and said new bit rate read in said first part of said memory location being subtracted from said total in said cumulating means, substantially simultaneously with writing of said adopted lower new bit rate in said first part of said memory location through said selecting means.

16. The device claimed in claim 12 wherein said context memory stores said requested bit rate extracted from said reservation cell, said cumulating means substracts said current bit rate from said total and said second output means transmits said reservation cell with said requested bit rate in response to said difference negative and/or a bit rate decrease request contained in said reservation cell, and in response to an acknowledgment cell received after said reservation cell with said requested bit rate, said cumulating means adds said requested bit rate extracted from said received acknowlegment cell to said total.

17. The device claimed in claim 15 wherein, relative to a memory location addressed by said identifier of said given routing channel and in response to said difference negative, said requested bit rate is added to said total and said current bit rate read in said first part of said memory location is substracted from said total in said cumulating means substantially simultaneously with writing said requested bit rate into the first memory location through the selecting means and transfer of said current bit rate from said first part to said second part of said memory location through said data outputs of said first part and said data inputs of said second parts of said context memory, and said requested bit rate extracted from said acknowledgement cell is added to said total, and said requested bit rate read in said first part of said memory location is subtracted from said total in said cumulating means substantially simultaneously with writing said requested bit rate extracted from said acknowledgement cell in said first memory location.

18. The device claimed in claim 15 wherein a content of said second part of said memory location is transferred into said first part of said memory location through said data outputs of said second parts of said context memory, said bit rate selecting means and said data inputs of said first parts of said context memory and is added to said total in said cumulating means simultaneously with said subtraction of said content of said first part of said location from said total in said cumulating means at expiry of a predetermined time-delay initiated by said reservation cell received by said first input means if no acknowledgement cell has been received by said second input means.

19. A device as claimed in claim 12 comprising means for converting a requested bit rate expressed in a first code contained in a reservation cell into said requested bit rate expressed in a second code applied to said subtracting means and to said context memory, means for converting a new bit rate expressed in said first code provided by said weighting means and applied to said second output means into said new bit rate expressed in said second code applied to said cumulating means and to said context memory, and means for converting a bit rate expressed in said first code contained in an acknowledgement cell into said adopted bit rate expressed in said second code applied to said cumulating means and to said context memory.

* * * * *